United States Patent [19]
Sato

[11] Patent Number: 5,203,312
[45] Date of Patent: Apr. 20, 1993

[54] EXHAUST GAS RECIRCULATION SYSTEM FOR INTERNAL COMBUSTION ENGINE

[75] Inventor: Toshiya Sato, Yokohama, Japan

[73] Assignee: Nissan Motor Co., Ltd., Yokohama, Japan

[21] Appl. No.: 879,834

[22] Filed: May 6, 1992

[30] Foreign Application Priority Data

May 14, 1991 [JP] Japan .................................. 3-138425

[51] Int. Cl.$^5$ ............................................ F02M 25/06
[52] U.S. Cl. ...................... 123/571; 123/568
[58] Field of Search ............................... 123/568, 571

[56] References Cited

U.S. PATENT DOCUMENTS

| | | | |
|---|---|---|---|
| 4,508,134 | 4/1985 | Kelly et al. ........................ | 123/568 |
| 4,531,498 | 7/1985 | Bradshaw ........................ | 123/568 |
| 4,540,153 | 9/1985 | Gomi et al. ........................ | 123/568 |
| 4,662,604 | 5/1987 | Cook ........................ | 123/568 |
| 4,708,316 | 11/1987 | Cook ........................ | 123/571 |
| 4,723,528 | 2/1988 | Tamura ........................ | 123/571 |
| 4,947,820 | 8/1990 | Kushi ........................ | 123/571 |
| 5,020,505 | 6/1991 | Grey et al. ........................ | 123/571 |
| 5,094,218 | 3/1992 | Everingham et al. ........................ | 123/571 |

FOREIGN PATENT DOCUMENTS 57-55901 11/1982 Japan .
1-130058 9/1989 Japan .

*Primary Examiner*—E. Rollins Cross
*Assistant Examiner*—M. Macy
*Attorney, Agent, or Firm*—Foley & Lardner

[57] ABSTRACT

An exhaust gas recirculation system for an automotive internal combustion engine includes an exhaust gas recirculation control valve disposed in an exhaust gas recirculation passage connecting intake air and exhaust gas passageways of the engine. The exhaust gas recirculation control valve is controllably operated in response to a signal vacuum or intake vacuum downstream of a throttle valve. The signal vacuum is regulated in response to an engine operating condition by a vacuum control valve. The vacuum control valve has a diaphragm-operated valve member for closing and opening an atmospheric air introduction port through which atmospheric air is introduced to modify or dilute the signal vacuum to be supplied to the exhaust gas recirculation control valve. The diaphragm of the vacuum control valve is biased by springs, in which the biasing force of the springs is controllable by a stepper motor regulated in response to the engine operating condition. During stopping of the engine, the stepper motor is regulated in a manner so that the valve member is maintained at a position remote from the atmospheric air introduction port, thereby preventing the valve member from sticking to a pipe defining the atmospheric air introduction port, due to a sticky material which enters from the intake passageway.

8 Claims, 4 Drawing Sheets

EXHAUST GAS RECIRCULATION SYSTEM FOR INTERNAL COMBUSTION ENGINE

BACKGROUND OF THE INVENTION

1. Field of the Invention

This invention relates to improvements in an exhaust gas recirculation system for an internal combustion engine, more particularly to a vacuum control valve (including a stepper motor) for regulating a signal vacuum to be supplied to an exhaust gas recirculation control valve for controlling exhaust gas recirculated back to the engine.

2. Description of the Prior Art

Hitherto, a variety of exhaust gas recirculation systems for recirculating exhaust gas back to the combustion chambers of the engine have been porposed and put into practical use. One of them is constructed and arranged as follows: A diaphragm-operated exhaust gas recirculation control valve is disposed in an exhaust gas recirculation passage which connects an intake air passageway and an exhaust gas passageway of the engine. The diaphragm of the exhaust gas recirculation control valve defines a vacuum chamber to be supplied with a signal vacuum such as an intake vacuum downstream of a throttle valve. The signal vacuum is modified by a diaphragm-operated vacuum control valve which is controlled in response to a control signal output from a control unit. Such an exhaust gas recirculation system is disclosed, for example, in Japanese Patent Publication No. 57-55901 and Utility Model Provisional Publication No. 1-130058.

The vacuum control valve includes a diaphragm defining an exhaust pressure chamber to be supplied with an exhaust gas pressure prevailing in the exhaust gas recirculation passage upstream of the exhaust gas recirculation control valve. The diaphragm further defines an atmospheric chamber to be supplied with atmospheric air or pressure, on the opposite side of the exhaust pressure chamber. A valve member is fixedly mounted on the diaphragm. An atmospheric air introduction port is formed facing the valve member and communicated with a vacuum passage through which the signal vacuum is supplied to the vacuum chamber of the exhaust gas recirculation control valve. Accordingly, when the exhaust gas pressure in the exhaust pressure chamber of the vacuum control valve lowers, the valve member separates from the atmospheric air introduction port, so that atmospheric air is introduced into the vacuum passage. In contrast, when the exhaust gas pressure rises, the valve member closes the atmospheric air introduction port, thereby interrupting introduction of atmospheric air into the vacuum passage. Thus, the opening degree of the exhaust gas recirculation control valve is basically determined by the relationship between the signal vacuum and the exhaust gas pressure, thereby mechanically controlling the characteristics of the amount of exhaust gas recirculated back to the engine combustion chambers.

The vacuum control valve is provided with an actuator which changes the spring load or biasing force of a spring biasing the diaphragm under electronic control of the control unit, thereby electronically controlling the amount of the recirculated exhaust gas at required characteristics. In other words, the spring load of the spring of the vacuum control valve is changed through the actuator, thereby correcting the opening and closing characteristics of the atmospheric air introduction port and accordingly the opening degree of the exhaust gas recirculation control valve.

However, drawbacks have been encountered in the above-discussed exhaust gas recirculation system as follows: During stopping of the engine, the valve member of the vacuum control valve is left seated on a seat defining the atmospheric air introduction port, and therefore it tends to stick to the seat with a sticky material entering the atmospheric air introduction port through the vacuum passage, leaving the atmospheric air introduction port closed. As a result, there is a possibility that the valve member cannot move or lift from its closing position even upon restarting of the engine. This causes a failed control of exhaust gas recirculation, while degrading the driveability of the engine.

SUMMARY OF THE INVENTION

It is an object of the present invention to provide an improved exhaust gas recirculation system for an internal combustion engine, which can overcome the drawbacks encountered in conventional exhaust gas recirculation systems.

Another object of the present invention is to provide an improved exhaust gas recirculation system including a vacuum control valve for regulating a signal vacuum to be supplied to an exhaust gas recirculation control valve, in which the vacuum control valve is prevented from the occurrence of troubles due to a sticky material which has entered the inside of the vacuum control valve, during stopping of the engine.

A further object of the present invention is to provide an improved exhaust gas recirculation system including a vacuum control valve for regulating a signal vacuum to be supplied to an exhaust gas recirculation control valve, in which a valve member in the vacuum control valve can be effectively prevented from being stuck to a seat (defining an atmospheric air introduction port) with a sticky material which reaches the atmospheric air introduction port through a vacuum passage through which a signal vacuum is supplied to the exhaust gas recirculation control valve, even during stopping of the engine.

An exhaust gas recirculation system of the present invention is for an internal combustion engine and comprises an exhaust gas recircultion passage for fluidly connecting an intake air passageway and an exhaust gas passageway of the engine. An exhaust gas recirculation control valve is disposed in the exhaust gas recirculation passage, and includes a diaphragm defining a vacuum chamber into which a signal vacuum is supplied, in which an amount of exhaust gas flowing through the exhaust gas recirculation passage is controlled in response to the signal vacuum. A vacuum control valve is provided and includes a diaphragm defining an atmospheric chamber and an exhaust pressure chamber which are respectively on the opposite sides of the diaphragm. The exhaust pressure chamber is supplied with an exhaust gas pressure prevailing in the exhaust gas recirculation passage downstream of the exhaust gas recirculation control valve. An atmospheric air introduction port is opened to the atmospheric chamber and communicated with the vacuum chamber of the exhaust gas recirculation control valve. A valve member is secured on the diaphragm and located facing the atmospheric air introduction port. The valve member is capable of closing and opening the atmospheric air introduction port so as to modify the signal vacuum. A spring device is provided to bias the diapragm in a direction of movement relative to the atmospheric air introduction port. A stepper motor is provided to change a biasing force of the spring device. Additionally, a controlling device is provided to control the stepper motor in accordance with an engine operating condition. The controlling device includes a first control device for controlling the stepper motor in a first manner to regulate an amount of exhaust gas passing through the exhaust gas recirculation passage, and a second control device for controlling the stepper motor in a second manner to maintain the valve member at a position remote from the atmospheric air introduction port during stopping of the engine.

Accordingly, in the exhaust gas recirculation system provided with the vacuum control valve which is arranged to change its valve opening pressure in response to the rotational angle of the stepper motor, the stepper motor is driven in a manner to maintain the valve member mounted on the diaphragm, remote from the atmospheric air introduction port during engine stopping under the action of the second control device. Hence, an exhaust gas recirculation can be effectively prevented from being disable due to a sticky material entering the atmospheric air introduction port through a vacuum passage through which the vacuum signal (for example, an intake vacuum generated downstream of a throttle valve) is supplied to the vacuum chamber of the exhaust gas recirculation control valve.

DETAILED DESCRIPTION OF THE INVENTION

Figure 1:
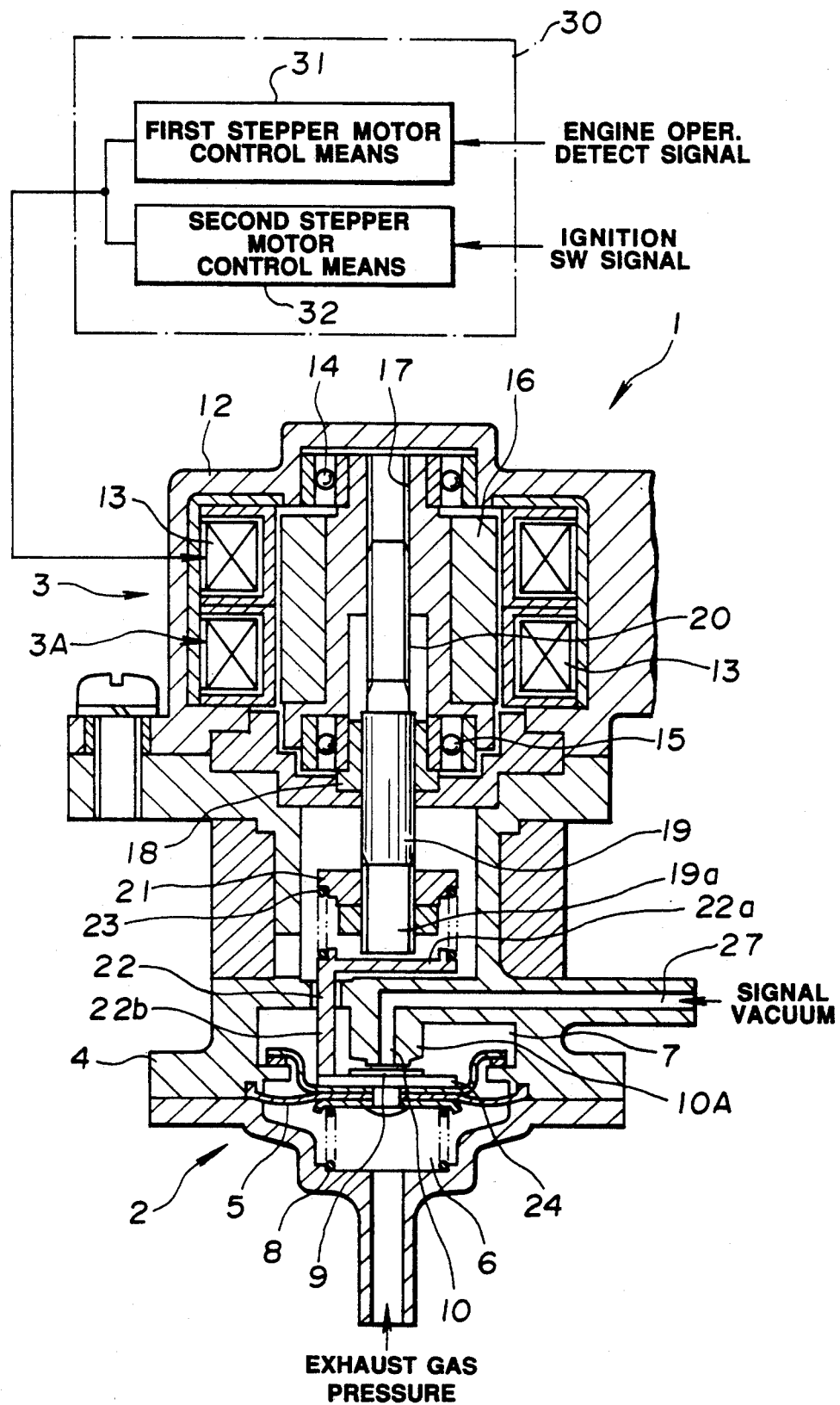
FIG. 1 is a vertical cross-sectional view of a vacuum control valve forming part of an embodiment of an exhaust gas recirculation system in accordance with the present invention.
Figure 2:
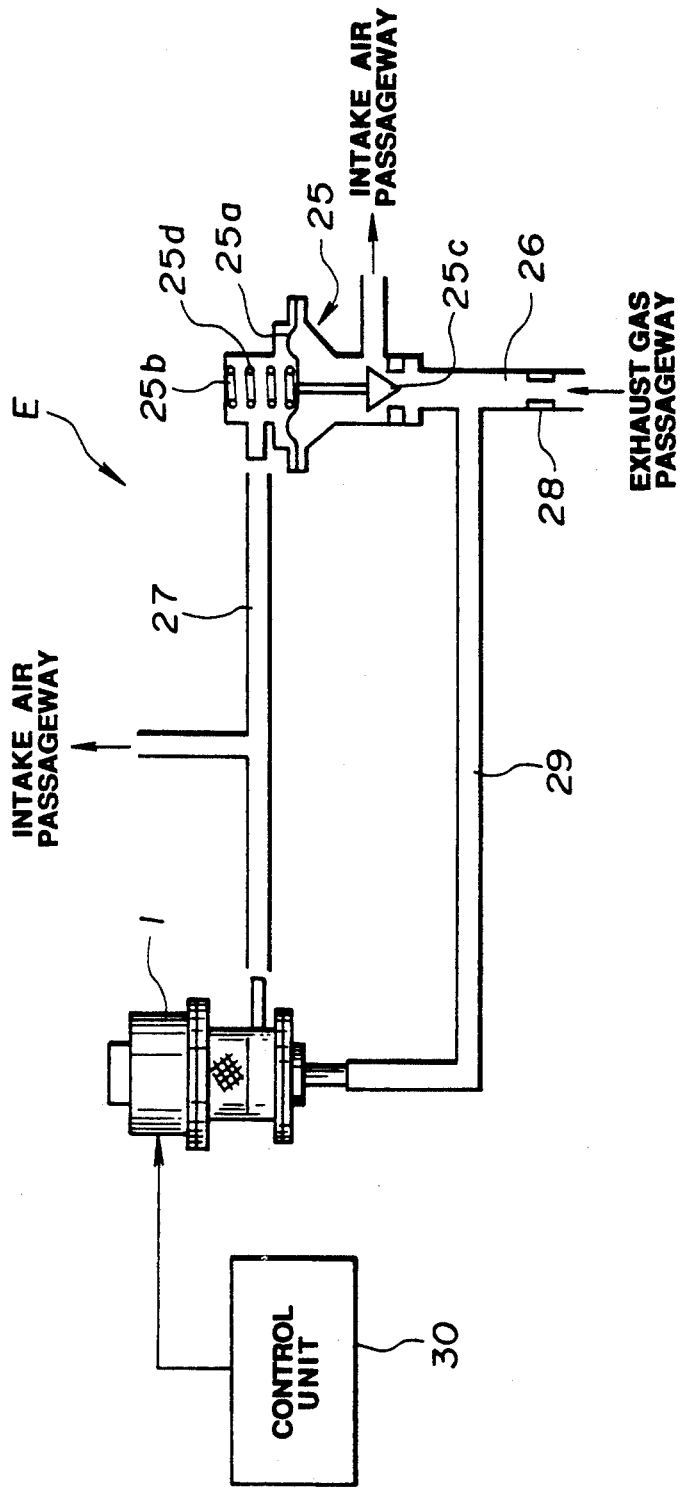
FIG. 2 is a schematic illustration of the first embodiment of the exhaust gas recirculation system in accordance with the present invention.

Referring now to FIGS. 1 and 2 of the drawings, a perferred embodiment of an exhaust gas recirculation (EGR) system according to the present invention is illustrated by the reference character E (in FIG. 2). The exhaust gas recirculation system E of this embodiment is incorporated with an internal combustion engine mounted on an automotive vehicle though not shown. The exhaust gas recirculation system E comprises a vacuum control valve 1 which includes a diaphragm operated valve section 2 located on the downside and a stepper motor section 3 located on the upside. The diaphragm operated valve section 2 generally functions to make a basic vacuum control in accordance with an exhaust gas pressure of the engine, while the stepper motor section 3 generally functions to modify the control characteristics of the basic vacuum control to obtain required control characteristics.

The diaphragm operated valve section 2 includes a diaphragm 5 disposed in a casing 4 in a manner that its peripheral section is fixedly secured to the inner wall of the casing 4. The diaphragm 5 defines an exhaust pressure chamber 6 on its downside and an atmospheric chamber 7 on its upside. The atmospheric chamber 7 is communicated with ambient air and supplied with atmospheric air. A set spring 8 under a compressed state is disposed in the exhaust pressure chamber 6 to bias the diaphragm 5 upwardly with a predetermined spring load or biasing force. A valve member 9 is fixed to the diaphragm 5 on the side of the atmospheric chamber 7. An atmospheric air introduction pipe 10A is fixedly disposed in the atmospheric chamber 7 and formed integral with the casing 4. The atmospheric air introduction pipe 10A is formed at its tip end with an atmospheric air introduction port 10 through which atmospheric air is sucked.

The stepper motor section 3 includes a stepper motor 3A disposed in a casing 12 which is secured to the casing 4. The stepper motor 3A includes a pair of stators 13 which are fixed to the casing 12. A rotor 16 is rotatably supported through bearings 14, 15 to the casing 12 and located inside the stators 13. The stepper motor 3A is arranged such that the rotational angle of the rotor 16 is controlled stepwise in accordance with predetermined pulse signals supplied to the coil of the stators 13 from a control unit 30, in which the rotor 16 makes one rotation or turn through 24 steps, in this instance. The rotor 16 is generally cylindrical and formed at its inner peripheral surface with an internal thread 17.

A guide member 18 is fixedly supported to the casing 12 and located inside the bearing 15. A plunger 19 is disposed inside the guide member 18, in which the guide member 18 is constructed to allow the plunger 19 to be axially movable but not to allow the plunger 19 to be rotatable around its axis. The plunger 19 is formed at its upper section with an external thread 20 which is in threaded engagement with the internal thread 17 of the rotor 16. Accordingly, the plunger 19 makes its straight axial movement along the axis of the stepper motor 3A when the rotor 16 rotates. The moving distance of the plunger 19 is controlled in accordance with the rotational angle of the rotor 16 of the stepper motor 3A. As shown, the plunger 19 is located such that the extension of its axis is perpendicular to and passes the center of the diaphragm 5. An annular spring seat 21 is fixedly secured on the lower end section of the plunger 19 and arranged perpendicular to the axis of the plunger 19, so that the spring seat 21 is axially movable together with the plunger 19. The lower end section of the plunger 19 extends downwardly passing through and beyond the spring seat 21 by a predetermined length, leaving a projected portion 19a.

An intermediate or connecting member 22 is movably disposed to mechanically connect the plunger 19 and the diaphragm 5. The intermediate member 22 is formed into a one-piece structure and includes a disc-shaped spring seat section 22a which is located parallel with the spring seat 21. An auxiliary spring 23 is disposed under a compressed state between the spring seat 21 and the intermediate member spring seat section 22a. The intermediate member 22 further includes a push rod section 22b which is integral with and projects from the disc-shaped spring seat section 22a and extends perpendicular to the spring seat section 22a and parallel with the extension of the axis of the plunger 19. The intermediate member push rod section 22b is in press contact with the an upper retainer 24 fixed to the diaphragm 24. As shown, the valve member 9 is fixedly mounted on the upper retainer 24 and faces the atmospheric air introduction port 10.

The above-discussed vacuum control valve 1 in this embodiment is used in the exhaust gas control system E as shown in FIG. 2. In FIG. 2, an exhaust gas recirculation (EGR) control valve 25 of the diaphragm type is disposed in an exhaust gas recirculation (EGR) passage 26 which connects an exhaust gas passageway and an intake air passageway of an internal combustion engine as shown by letters in FIG. 2. As usual, exhaust gas from the engine flows through the exhaust gas passageway, while intake air to be sucked into the engine flows through the intake air passageway. A part of the exhaust gas flowing through the exhaust gas passageway is recirculated or fed back to the intake air passageway through the EGR passage 26, and sucked into the engine together with intake air. The EGR control valve 25 includes a diaphragm 25a defining a vacuum chamber 25b. A valve member 25c is connected to the diaphragm 25a and movable relative to a valve seat (not identified) in the EGR passage 26. A compression spring 25d is disposed in the vacuum chamber 25b to bias the diaphragm 25a in a direction to allow the valve member 25c to seat on the valve seat so as to close the EGR passage 26. Thus, the amount of exhaust gas recirculated to the engine is controlled in response to the movement of the diaphragm 25a or to a vacuum prevailing in the vacuum chamber 25b.

The vacuum chamber 25b is supplied through a vacuum passage 27 with an intake vacuum or signal vacuum generated in the intake air passageway downstream of a throttle valve (not shown). The vacuum passage 27 is communicated with the atmospheric air introduction port 10 of the vacuum control valve 1. Under the action of the vacuum control valve 1, the signal vacuum is controllably modified or diluted with atmospheric air in the atmospheric chamber 7, so that the vacuum prevailing in the EGR control valve vacuum chamber 25b is controlled, thereby controlling the opening degree of the EGR control valve 25 or the relative position of the valve member 25c to the valve seat. Additionally, the EGR passage 26 is provided at its inside with an orifice 28 disposed upstream of the EGR control valve 25 or on the side of the exhaust gas passageway relative to the EGR control valve 25. The part of the EGR passage 26 between the orifice 28 and the EGR control valve 25 is communicated with the exhaust pressure chamber 6, so that the exhaust pressure chamber 6 is supplied with the exhaust gas pressure prevailing in the EGR passage 26 between the EGR control valve 25 and the orifice 28.

The control unit 30 includes a microcomputer and functions to control the operation of the stepper motor 3A in accordance with an engine operating condition. More specifically, the control unit 30 includes first stepper motor control means 31 for controlling the operation of the stepper motor 3A in a manner to regulate the amount of exhaust gas passing through the exhaust gas recirculation passage 26, in accordance with the engine operating condition. The first stepper motor control means 31 is adapted to input engine operation direction signals representative of engine operating conditions including engine speed, engine load and the like, and to output control signals (pulse signals) to the coil of the stator 13 of the stepper motor 3A in accordance with the input signals, thereby controlling the amount of exhaust gas recirculated back to the engine. As discussed above, the stepper motor 3A of the vacuum control valve 1 is arranged to make one rotation or turn through 24 steps, in which the operational range of the stepper motor 3A is determined by 0 to 32 steps.

The vacuum control valve 1 as shown in FIG. 1 is in a condition in which the step number of the stepper motor 3A is at a suitable intermediate value, in which the tip end of the plunger 19 and the intermediate member 22 are spaced from each other to some extent. In this state, the pressure differential between the exhaust gas pressure (in the exhaust pressure chamber 6) and atmospheric pressure (in the atmospheric chamber 7) acts on the diaphragm 5. Concurrently with this, the diaphragm 5 is biased in a such a direction that the valve member 9 comes into contact with the tip end of the atmospheric air introduction pipe 10A to close the atmospheric air introduction port 10 under the bias of the set spring 8, and additionally in such a direction that the valve member 9 separates from the tip end of the atmospheric air introduction pipe 10A to open the atmospheric air introduction port 10 under the bias of the auxiliary spring 23. Accordingly, the atmospheric air introduction port 10 is opened when the exhaust gas pressure in the exhaust pressure chamber 6 is lower than a pressure (referred to as a "valve opening pressure") determined by the spring loads or biasing forces of the springs 8, 23, while it is closed when the exhaust gas pressure in the exhaust pressure chamber 6 is higher than the valve opening pressure. Accordingly, the amount of atmospheric air introduced through the atmospheric air introduction port 10 into the vacuum passage 27 decreases as the exhaust gas pressure increases thereby increasing the opening degree of the EGR control valve 25, on the assumption that the intake vacuum used as the signal vacuum is constant in pressure.

Figure 3:
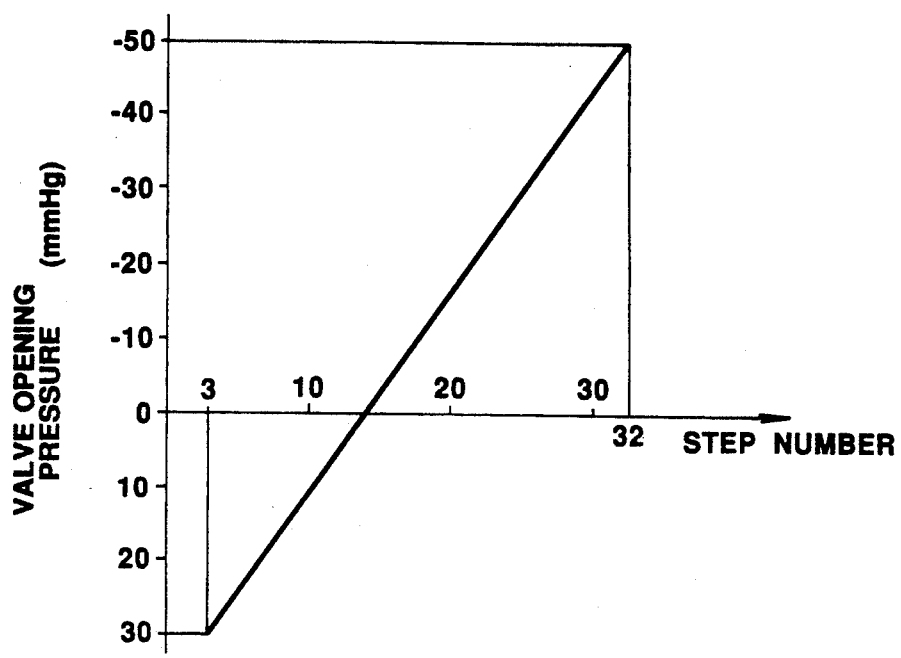
FIG. 3 is a graph showing the characteristics of valve opening pressure of the vacuum control valve of FIG. 1.

Here, since the spring load of the auxiliary spring 23 changes with the location of the spring seat 21 supporting the upper end of the spring 23, the above-mentioned valve opening pressure lowers when the spring seat 21 moves upward under a rotation of the stepper motor 3A while it rises when the spring seat 21 moves downward under a reverse rotation of the stepper motor 3A. Thus, the opening and closing characteristics of the atmospheric air introduction port 10 are modified or regulated under control of the rotational angle of the rotors 16 of the stepper motor 3A, thereby controlling final exhaust gas recirculation characteristics (by the EGR valve 25) as required. The characteristics of the valve opening degree obtained correspond to the step number of the stepper motor 3A is shown in FIG. 3.

Thus, in the vacuum control valve 1, the biasing force acting on the diaphragm 5 changes in accordance with the rotational angle of the stepper motor 3A, and therefore a stable control is attained on the exhaust gas recirculation without being affected by the voltage of a battery as an electric source, temperature conditions and the like. Additionally, the exhaust gas pressure is prevented from being largely changed, thereby always maintaining stable exhaust gas recirculation control characteristics.

The control unit 30 further includes a second stepper motor control means 32 which is adapted to input an ignition switch signal (generated when an ignition switch of the engine is switched ON) and for outputting a control signal to the stepper motor 3A in response to absence of ignition switch signal (or a condition in which no ignition switch signal is generated), thereby maintaining the valve member 9 of the vacuum control valve 1 at a position separate from the atmospheric air introduction port 10, thus accomplishing a stopping position control of the valve member 9. When the step number of the stepper motor 3A is controlled at predetermined values (0 to 3) under the action of the control signal from the second stepper motor control means 32 of the control unit 30, the tip end of the plunger 19 comes into contact with the intermediate member 22, so that the valve member 9 is kept separate from the tip end of the atmospheric air introduction pipe 10A or from the atmospheric air introduction port 10. Accordingly, the vacuum passage 27 is open to atmospheric air regardless of the exhaust gas pressure, thereby prohibiting the opening operation of the EGR valve 25.

Figure 4:
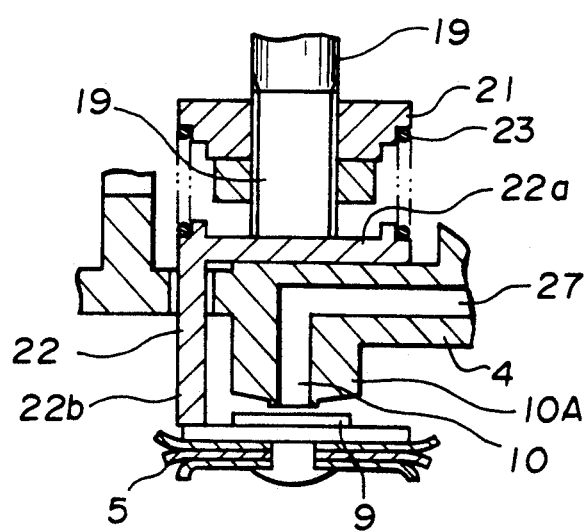
FIG. 4 is a cross-sectional view of an essential part of the vacuum control valve of FIG. 1, showing an operational mode of the valve.

Thus, the valve member 9 of the vacuum control valve 1 is kept at a position remote from the atmospheric air introduction port 10 during stopping of the engine, as shown in FIG. 4. Therefore, the valve member 9 is effectively prevented from being adhered to the tip end of the atmospheric air introduction pipe with a sticky material which has entered the atmospheric air introduction port 10 through the vacuum passage 27, thus avoiding occurrence of failed operation of the vacuum control valve 1. Additionally, at an engine starting, the atmospheric air introduction port 10 is kept in its open state as discussed above, and no exhaust gas recirculation is carried out thereby maintaining good engine starting characteristics.

Figure 5:
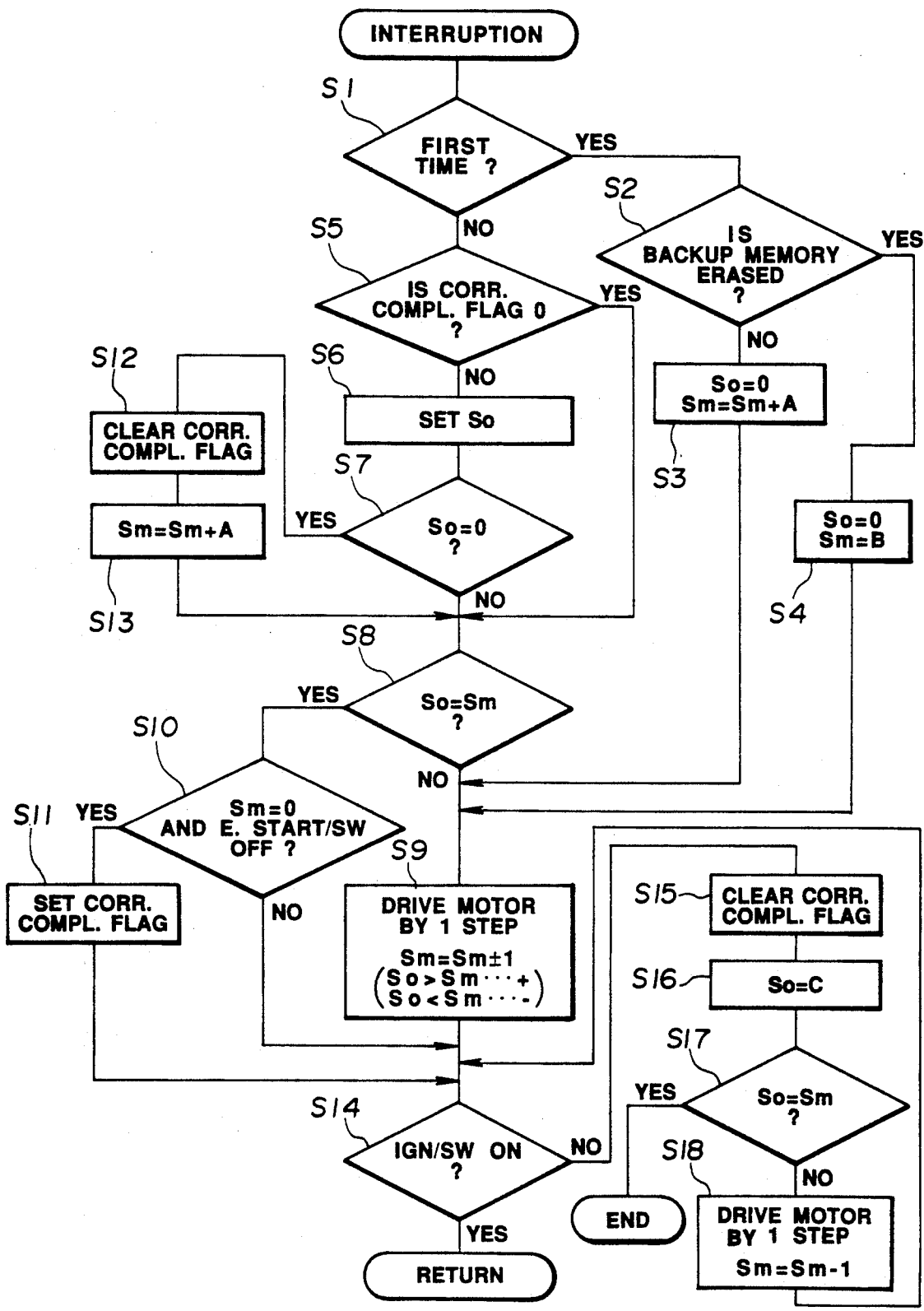
FIG. 5 is a flowchart showing the control program for the vacuum control valve of FIG. 1.

Next, the exhaust gas recirculation control under the action of the vacuum control valve 1 and the stopping position control for the valve member 9 will be discussed with reference to the flowchart of FIG. 5. The flowchart of FIG. 5 shows a control program of the vacuum control valve 1, executed by the control unit 30. This flowchart is executed at intervals of a predetermined time as an interruption handling. In the flowchart, So represents at target step number which is set in accordance with an engine operating condition at a step S6 during a normal engine operation. The step So is, for example, looked up from a table map (not shown) whose parameters are an engine speed and an engine load. The parameter of the table map may also be, for example, a basic fuel injection amount calculated in accordance with the engine speed and load, in case of an engine provided with an electronically controlled fuel injection system, in which the amount of fuel to be actually injected from a fuel injector is determined in accordance with the basic fuel injection amount. Sm represents a monitored value of the step number of the stepper motor 3A, recognized by the control unit 30. One is added to or subtracted from the monitored value Sm whenever the stepper motor 3A makes its rotation or is driven by one step (at a step S9). After engine stopping, the data of monitored value Sm is retained in a backup memory of the control unit 30.

The basic control of the stepper motor 3A is accomplished as follows: First, the target step number So is set at the step S6 as discussed above. Then, a comparison is made between the current monitored value Sm and the target step number So at a step S8. In case they are not the same, the flow of the flowchart goes to a step S9 at which the stepper motor 3A is driven one step by one step. Concurrently with this, one is added to or subtracted from the monitored value Sm. Upon repetition of the above procedure, the rotational angle of the stepper motor 3A is always controlled in a manner to follow the target step number So. In the exhaust gas recirculation system of this embodiment arranged as shown in FIGS. 1 and 2, a sensor for detecting the actual rotational angle of the stepper motor 3A is not provided, and therefore there is a possibility that the actual step number of the stepper motor 3A shifts from the monitor value Sm recognized by the control unit 30, for some reason. In this regard, in the control program of the flowchart of FIG. 5, a zero point correction of the stepper motor 3A is accomplished at every engine starting and in an exhaust gas recirculation stopping region (in which no exhaust gas recirculation is made) during engine operation.

First at step S1 in the flowchart of FIG. 5, a judgement is made as to whether the execution of the program of the flowchart is at the first time or not. Only in case of the first time after engine starting, the flow of the flowchart goes to a step S2 from the step S1. At the step S2, a judgement is made as to whether the backup memory is erased or not. This is because there is a possibility that the monitored value Sm is erased due to a temporary disconnection of a battery as an electric source. The judgement is, for example, made in accordance with the state of a flag in the backup memory in the control unit 30. In case the backup memory is normal, the flow goes to a step S3 at which the target step number So is set at 0 while a suitable constant A (for example, 4 or a number around 4) is added to the monitored value Sm.

In case the execution of the program is after the first time, i.e., not at the first time, the flow goes from the step S1 to a step S5 at which a judgement is made as to whether a flag for indicating completion of the zero point correction of the stepper motor 3A is 0 or not. This correction completion flag is cleared when the engine is stopped (as indicated at a step S15), so that it is 0 at this time. Accordingly, the flow goes from the step S5 to the step S8 at which the target step number So is maintained as it is. As a result, the stepper motor 3A rotates one step by one step toward the step number 0. Here, since the constant A is added to the monitored value Sm as discussed above, the stepper motor 3A has rotated excessively by a rotational angle corresponding to the constant A at a stage establishing the relationship of So=Sm (as indicated at the step S8). For example, in case the step number (monitored value Sm) has been 2 when the engine is stopped, a return to the zero point can be accomplished under rotation of the stepper motor 3A by the step number 2; however, the stepper motor 3A will make its rotation by 6 steps upon addition of the constant A (for example, 4 steps) to the monitored value. Accordingly, the stepper motor 3A securely rotates until the plunger 19 reaches its lower limit position or a position at which the downward movement of the plunger 19 is mechanically restricted. At this time, even if there is a slight deviation between the actual step number and the monitored value Sm, they are met at the zero point and therefore the deviation is corrected. When the monitored value Sm has become 0 while an engine starter switch (not shown) for starting an engine is switched ON at a step S10, the flow goes to a step S11 at which the correction completion flag is set at 1. Thereafter, the flow goes from the step S5 to the step S6 at which the normal target step number So is set, so that the rotational angle control of the stepper motor 3A is accomplished in accordance with this target step number So.

In case the judgement of the backup memory having been erased is made at the step S2, the flow goes from the step S2 to the step S4 at which the monitored value Sm is set at a constant B. It is preferable that the this constant B is a number near the maximum value (32) of the step number. In this case, the stepper motor 3A is rotated to some extent even after the stepper motor 3A has reached the actual zero point (at which the plunger 19 is at its lower most position) under the action of the procedures after this, so that the correction of the zero point of the stepper motor 3A can be securely achieved.

In this embodiment, the zero point correction is accomplished in an engine operating region at which the target step number So is zero, i.e., in the exhaust gas recirculation stopping region, even during engine operation. That is to say, at a step S7, a judgement is made as to whether the target step number So is 0 or not. In case of zero, the flow goes to a step S12 at which the correction completion flag is cleared. Then, the flow goes to a step S13 at which the constant A is added to the monitored value Sm the same as the step S3. As a result, the stepper motor 3A makes its rotation until the mechanical zero point has been reached, thereby smoothly accomplishing the zero point correction. It will be understood that a sufficient control accuracy can be maintained even if such a zero point correction during engine operation is omitted.

At a step S14, the stopping of the engine is determined based upon whether the engine ignition switch has been switched OFF. The flow goes through the step S15 (at which the correction completion flag is cleared) to a step S16 at which the target step number So is set at a suitable constant C. This constant C is a number near 0 and not larger than 3 in order to put the value member 9 at a position remote from the atmospheric pressure introduction port 10.

Subsequently, at a step S17, a comparison is made between the current monitored value Sm and the above-mentioned target step number So. If they are not the same, the flow goes to a step S18 at which the stepper motor 3A makes its rotation or is driven by one step in a direction in which the step number decreases. At a stage establishing the relationship of So=Sm as shown in a step S17, this control is completed. At this stage, the stepper motor 3A has rotated by a rotational angle corresponding to the constant C, so that the value member 9 of the diaphragm 5 is remote from the atmospheric air introduction port 10 to some extent as shown in FIG. 4. As a result, the value member 9 is prevented from being adhered to the tip end of the atmospheric air introduction pipe 10A during stopping of the engine.

What is claimed is:

1. An exhaust gas recirculation system for an internal combustion engine, comprising:
    means defining an exhaust gas recirculation passage for fluidly connecting an intake air passageway and an exhaust gas passageway of the engine;
    an exhaust gas recirculation control valve disposed in said exhaust gas recirculation passage, said exhaust gas recirculation control valve including a diaphragm defining a vacuum chamber into which a signal vacuum is supplied, and means for controlling an amount of exhaust gas flowing through the exhaust gas recirculation passage in response to said signal vacuum;
    a vacuum control valve including a diaphragm defining an atmospheric chamber and an exhaust pressure chamber respectively on the opposite sides of said diaphragm, said exhaust pressure chamber being supplied with an exhaust gas pressure prevailing in said exhaust gas recirculation passage downstream of said exhaust gas recirculation control valve, means defining an atmospheric air introduction port which is opened to said atmospheric chamber and communicated with said vacuum chamber of said exhaust gas recirculation control valve, a valve member secured on said diaphragm and located facing said atmospheric air introduction port, said valve member being capable of closing and opening said atmospheric air introduction port so as to modify said signal vacuum, spring means for biasing said diaphragm in a direction of movement relative to said atmospheric air introduction port, and a stepper motor for changing a biasing force of said spring means;
    means for controlling the stepper motor in accordance with an engine operating condition, said controlling means including first control means for controlling the stepper motor in a first manner to regulate an amount of exhaust gas passing through the exhaust gas recirculation passage, and second control means for controlling said stepper motor in a second manner to maintain said valve member at a position remote from said atmospheric air introduction port during stopping of the engine.

2. An exhaust gas recirculation system as claimed in claim 1, further comprising means defining a vacuum passage through which said signal vacuum is supplied into said vacuum chamber of said exhaust gas recirculation valve, said vacuum passage being communicated with said atmospheric air introduction port of said vacuum control valve.

3. An exhaust gas recirculation system as claimed in claim 1, wherein said vacuum control valve further includes means for operatively connecting said stepper motor and said spring means to transmit the movement of said stepper motor to said spring means.

4. An exhaust gas recirculation system as claimed in claim 1, wherein said second control means of said controlling means is arranged to maintain said valve member at said position regardless of said exhaust gas pressure in said exhaust pressure chamber of said vacuum control valve.

5. An exhaust gas recirculation system as claimed in claim 1, wherein said atmospheric chamber is communicated with ambient air to be supplied with atmospheric air.

6. An exhaust gas recirculation system as claimed in claim 1, wherein said signal vacuum is an intake vacuum generated in said intake air passageway downstream of a throttle valve of the engine.

7. An exhaust gas recirculation system as claimed in claim 1, wherein said vacuum control valve includes a plunger which is connected to said stepper motor and adapted to axially move in accordance with a rotational operation of said stepper motor and a connecting member disposed between said plunger and said diaphragm to transmit an axial movement of said plunger to said diaphragm.

8. An exhaust gas recirculation system as claimed in claim 7, wherein said second control means includes a control circuit to generate a control signal to said stepper motor in response to the stopping of the engine, said control signal: (a) causing said stepper motor to rotate in a direction such that said plunger axially moves to push said diaphragm away from said atmospheric air introduction port through said connecting member; and (b) then causing said stepper motor to stop as it is.

* * * * *